(12) United States Patent
Slaight

(10) Patent No.: US 8,423,690 B2
(45) Date of Patent: Apr. 16, 2013

(54) METHODS AND APPARATUS FOR MEDIA REDIRECTION

(75) Inventor: Thomas Slaight, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 567 days.

(21) Appl. No.: 11/967,308

(22) Filed: Dec. 31, 2007

(65) Prior Publication Data

US 2009/0172240 A1 Jul. 2, 2009

(51) Int. Cl.
*G06F 13/14* (2006.01)

(52) U.S. Cl.
USPC .................................. 710/74; 710/5; 710/313

(58) Field of Classification Search .................... None
See application file for complete search history.

(56) References Cited

U.S. PATENT DOCUMENTS

| | | | |
|---|---|---|---|
| 6,480,809 B1 | 11/2002 | Slaight | |
| 6,772,253 B1 | 8/2004 | Slaight et al. | |
| 6,882,963 B1 | 4/2005 | Slaight | |
| 6,907,377 B2 | 6/2005 | Slaight et al. | |
| 7,103,692 B2 | 9/2006 | Kwatra et al. | |
| 7,225,247 B2 | 5/2007 | Kennedy et al. | |
| 7,457,969 B2 | 11/2008 | Slaight | |
| 2002/0077954 A1 | 6/2002 | Slaight et al. | |
| 2004/0078456 A1 | 4/2004 | Kennedy et al. | |
| 2004/0098527 A1 | 5/2004 | Kwatra et al. | |
| 2004/0193976 A1 | 9/2004 | Slaight et al. | |
| 2004/0204879 A1 | 10/2004 | Slaight et al. | |
| 2005/0125199 A1 | 6/2005 | Slaight | |
| 2005/0138171 A1 | 6/2005 | Slaight | |
| 2005/0238035 A1* | 10/2005 | Riley | 370/401 |
| 2005/0289218 A1* | 12/2005 | Rothman et al. | 709/203 |
| 2006/0123137 A1* | 6/2006 | DeHaemer et al. | 710/2 |
| 2008/0046628 A1 | 2/2008 | Hunsaker et al. | |
| 2008/0080496 A1 | 4/2008 | Slaight | |
| 2009/0083760 A1 | 3/2009 | Slaight | |

OTHER PUBLICATIONS

"Management Component Transport Protocol (MCTP) Overview," DMTF, Jul. 2007, 15 pages.
Non-Final Office Action received for U.S. Appl. No. 11/967,308, mailed on Sep. 14, 2010, 12 pages.
Egevang, et al., "RFC1631—The IP Network Address Translator (NAT)", dated May 1994, 8 pgs. Available at: http://www.faqs.org/rfcs/rfc1631.html; retrieved on Mar. 19, 2010.
"Transparent Bridging", Doc wiki, Retrieved on Feb. 22, 2011, Document available at: http://docwiki.cisco.com/wiki/Transparent_Bridging.
"Data Encapsulation & Desapsulation in the OSI Model", May 23, 2011, downloaded from http://www.firewall.cx/networking-topics/the-osi-model/179-osi-data-encapsulation.html, 4 pages.

* cited by examiner

*Primary Examiner* — Ilwoo Park
(74) *Attorney, Agent, or Firm* — Grossman, Tucker, Perreault & Pfleger, PLLC

(57) ABSTRACT

A method includes generating a storage device request directed to a register of a computing device that is used to access a storage device of the compute device. The method further includes determining with a media redirection device to redirect the storage device request to a storage device connected to a network. The method further includes transmitting over a host bus of the computing device a packetized message representing the storage device request from the media redirection device to a network controller. An associated apparatus is also disclosed.

12 Claims, 4 Drawing Sheets

METHODS AND APPARATUS FOR MEDIA REDIRECTION

BACKGROUND

Network-attached storage is file-level data storage connected to a computer network providing data access to heterogeneous network clients. A network client may access data stored on a network-attached storage device through both hardware and software applications, such that the network-attached storage device appears to be directly connected to the network client. A general-purpose computing device may contain software that enables it to serve the role of network attached storage.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
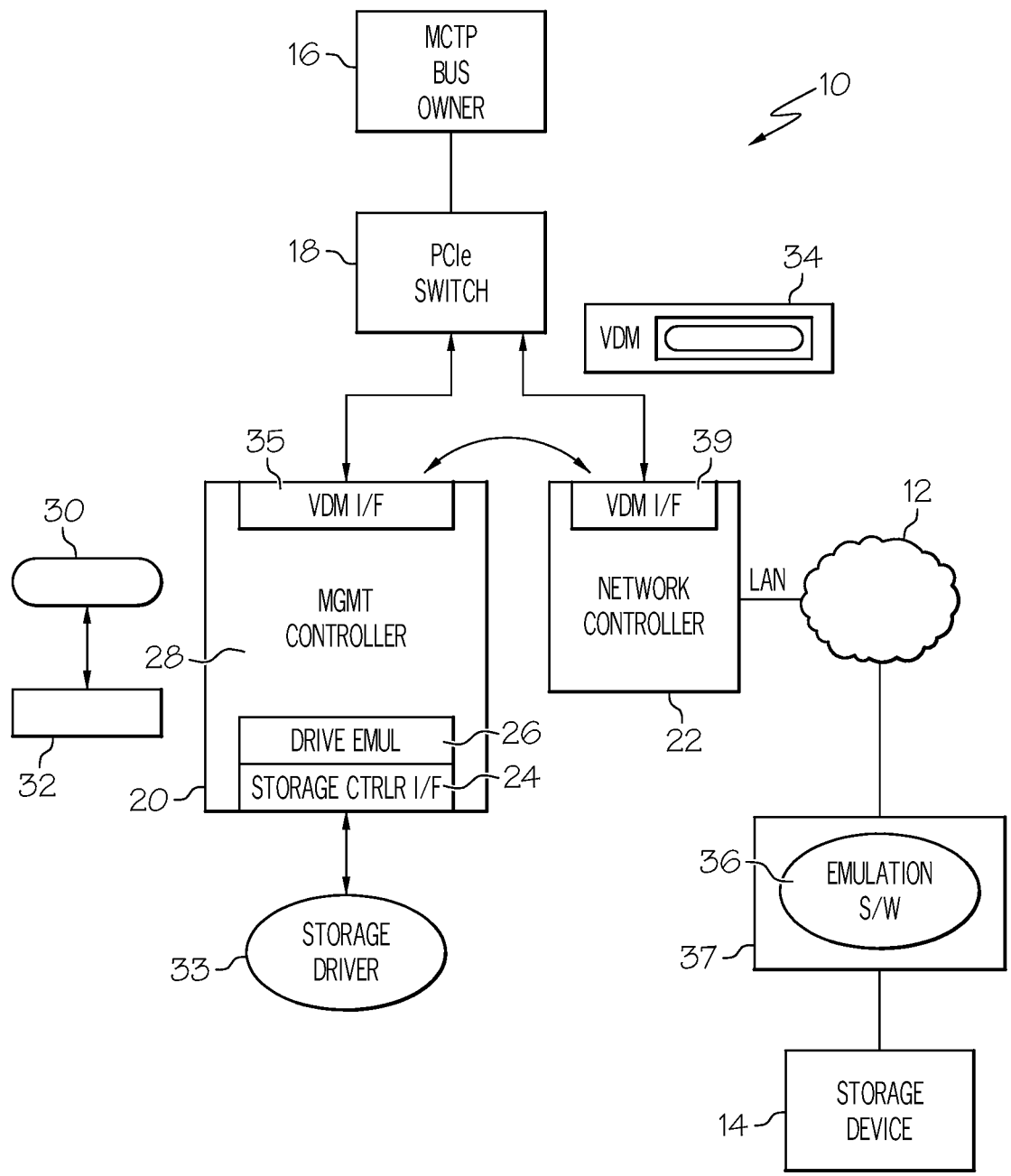
FIG. 1 shows a block diagram of an illustrative embodiment of a system implementing media redirection.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as types and interrelationships of system components and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an illustrative embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Media redirection provides an interface to a computing device to allow access of a storage device located on a network to appear to the computing device as if it were connected "locally" (i.e., non-network based). Thus, instead of the storage device data being accessed locally, data transfer actually occurs over a network using software that is running on a "remote" system located on a network. Thus, to software that is running on the computing device, a media redirection subsystem may appear as a locally connected storage device (e.g., CD/DVD, Hard Drive, USB storage device, etc.). However, storage data is actually accessed by accessing a storage device located on a network.

Referring now to FIG. 1, a block diagram of an illustrative embodiment of a system configured for media redirection is shown. In this illustrative embodiment, a computing device 10 is connected to a network 12. A storage device 14 is connected to the network 12 as well. The computing device 10 includes a bus owner 16, such as a processor, for example. In one embodiment, a bus owner 16 may be responsible for setting up a bus function to enable peer-to-peer communication between devices on various bus segments. For example, peer-to-peer communication may be set up between a management controller 28 and a network controller 22, as further described herein. The bus owner 16 is connected to a bus controller 18, which in this illustrative configuration may be a PCI Express interconnect switch. A PCI Express interconnect switch, as described in PCI Express Base Specification Revision 2.0, is a high performance, general purpose I/O interconnect defined for a wide variety of computing and communication platforms.

In the configuration of FIG. 1, the host bus controller 18 is connected to a media redirection device 20 and a network controller 22. The network controller 22 is connected to the network 12 providing a communication link between the computing device 10 and the network 12.

The media redirection device 20 may be a physical device that includes a storage controller interface 24, a drive emulation device 26, and a management controller 28. During operation, a storage driver 33 may generate a request 30 to access the storage device 14, which may be a request for control of the storage device 14 or data stored thereon, for example. The request 30 may be directed to a storage interface register 32.

The storage controller interface 24 is accessed by the computing device 10 as a result of executing software such as the storage device driver 33. The drive emulation device 26 may then convert the storage register accesses and data transfers over the interface to convert the requests 30 to "messages," which are properly prepared for transferring to the storage device. Thus, the drive emulation device 26 is able to "emulate" the operation of a locally, or directly, connected drive as appearing to the computing device 10.

The management controller 28 may interpret storage register accesses that may represent the storage access request 30 and associated data, which may be encapsulated in a network protocol and transmitted as vendor defined messages (VDMs) 34 over the host bus controller 18 to the network 12 and to software 36 that runs on a system 37 connected to network 12. In one embodiment, the VDMs 34 may be transmitted as PCI Express packets over the PCI interconnect switch. Furthermore, the computing device 10 may operate according to management component transport protocol (MCTP), which is described in Management Component Transport Protocol (MCTP) White Paper, version 1.0.0a (published July, 2007). The MCTP allows media redirection traffic to take the form of VDMs.

In one embodiment, the management controller 28 may be a microcontroller or processor that aggregates management parameters (e.g., temperature, speed, volts, etc.) from one or more management devices (e.g., a temperature sensor chip) and makes access to the management parameters available to local or remote software, or to other management controllers, via one or more management data models.

The media redirection device 20 includes a VDM interface 35, which allows the packetized VDMs 34 to be transferred to and from the media redirection device 16 through the host bus controller 18 to the network controller 22, allowing the packetized VDMs 34 to be transmitted onto the network 12 at the appropriate time. The network controller 22 also includes a VDM interface 39 allowing it to receive/transmit PCI Express packets, such as VDMs 34. These packets implement a messaging protocol that enables sending and receiving network packets. The emulation software 36 running on the network may handle data transfers and storage requests for a system containing a media redirection device 22. Upon receipt of the packetized VDMs 34, the appropriate response may be generated by the network 12 and associated software/hardware, such as providing control of the storage device 14 to the computing device or transmitting data stored on the storage device 14.

Figure 2:
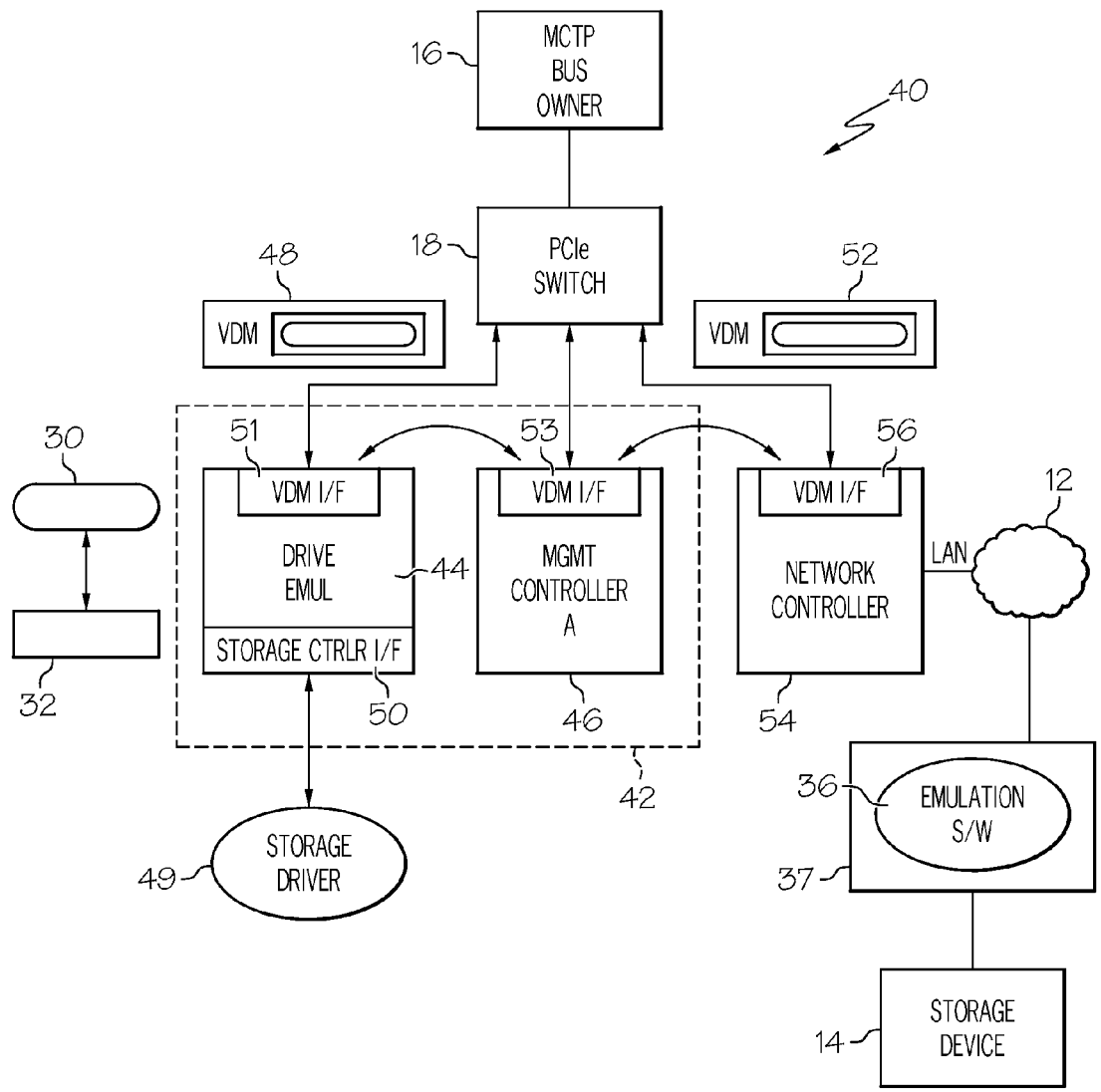
FIG. 2 shows a block diagram of a block diagram of an illustrative embodiment of another system implementing media redirection.

Referring now to FIG. 2, a block diagram of another illustrative embodiment of a system configured for media redirection is shown. In this illustrative embodiment, a computing device 40 is connected to the network 12, similar to the computing device 10 of FIG. 1. The computing device 40 includes a media redirection device 42, which allows the computing device 40 to access the storage device 14 located on the network 12, while appearing to be locally connected to the computing device 40, similar that described in regard to FIG. 1. In FIG. 2, the media redirection device 42 includes drive emulation device 44 and a management controller 46 as separate modules from one another. A register 47 associated with drive emulation device receives the request 30. Software, such as a storage controller driver 49, running on a host processor (not shown) associated with the computing device 40, accesses the storage controller interface 50.

The drive emulation device 44 converts the request 30 to a VDM 48 and transmits it to the host bus controller 18, which may be a PCI Express interconnect switch in this illustrative embodiment. The drive emulation device 44 includes a VDM interface 51, similar to that described in regard to FIG. 1. The VDM 48 is transmitted via the host bus 18 to the management controller 46, which includes a VDM interface 53. The management controller 46 may packetize the VDM 48 and transmit the packetized VDM 52 through the host bus 18 to the network controller 54, which also includes a VDM interface 56 in this illustrative configuration. Similar to that described in regard to FIG. 1, the network controller 56 is configured to transmit packetized VDMs 52 onto the network 12, where a storage device 14 being sought can be accessed. In one embodiment, the packetized VDMs may include encapsulated data for network packets. The management controller 46 creates the network packet data from the storage data and transfer requests 30 that are encapsulated in VDMs 48 that are transferred between the management controller 46 and the storage controller 50. Emulation software 36 is used to properly read the packetized VDMs 52 for access of the storage device 14. The appropriate response may then be generated by the network 12 and associated software/hardware to meet the request 30.

Figure 3:
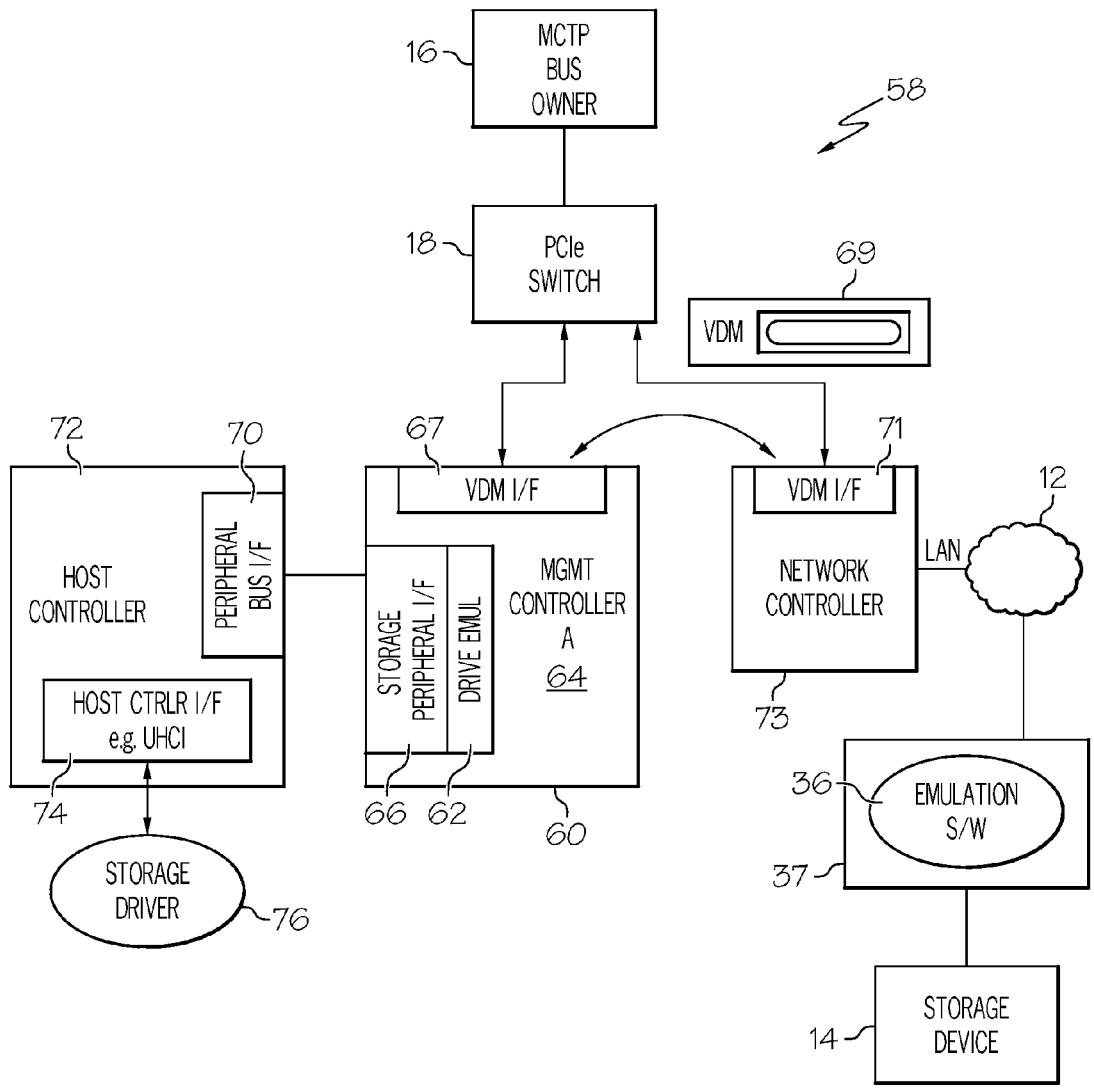
FIG. 3 shows a block diagram of a block diagram of an illustrative embodiment of another system implementing media redirection.

Referring now to FIG. 3, a block diagram of another illustrative embodiment of a system configured for media redirection is shown. Similar to the illustrative embodiment of FIG. 1, FIG. 3 illustratively shows a computing device 58 that implements a media redirection device 60 to access the storage device 14 from connected to the network 12. In this illustrative configuration, a media redirection device 60 includes a drive emulation device 62 and a management controller 64.

The media redirection device 62 is connected to a host bus controller 18, which may be illustratively embodied as a PCI Express interconnect in FIG. 3. The media redirection device 60 includes a storage peripheral interface 66, such as, for example, a Universal Serial Bus (USB) interface. The media redirection device 62 is connected to a peripheral bus interface 70 included in a host controller 72. In this configuration, the drive emulation device 62 may provide a physical interface, the storage peripheral interface 68, and emulate a storage device interface register that connected to the host controller 72, which is locally connected to the computing device 58. The host controller 72, through host controller interface 74, is accessed through software, such as storage driver 76, running on the computing device 58. It should be appreciated that the host controller interface 74 can be implemented in various forms, such as a Universal Host Controller Interface, for example.

Once the host controller 72 is accessed, the drive emulation device 62 converts the request received by the host controller 72 to a VDM, which is then packetized by the management controller 66 and transmitted to the network controller 73 to the host bus 18 using VDM interfaces 67 and 71. The packetized VDM 69 is then transmitted to the network 12 and via a network controller 72 directed to the storage device 14 subsequent to the message being processed by the emulation software 36 running on the system 37. The appropriate response may then be generated by the network 12 and associated software/hardware to meet the storage device access request. In one embodiment, the network controller 72 may include a host interface 75, allowing the computing system 58 to utilize the network 12 as when the VDM interface 71 is being used for redirection traffic.

Figure 4:
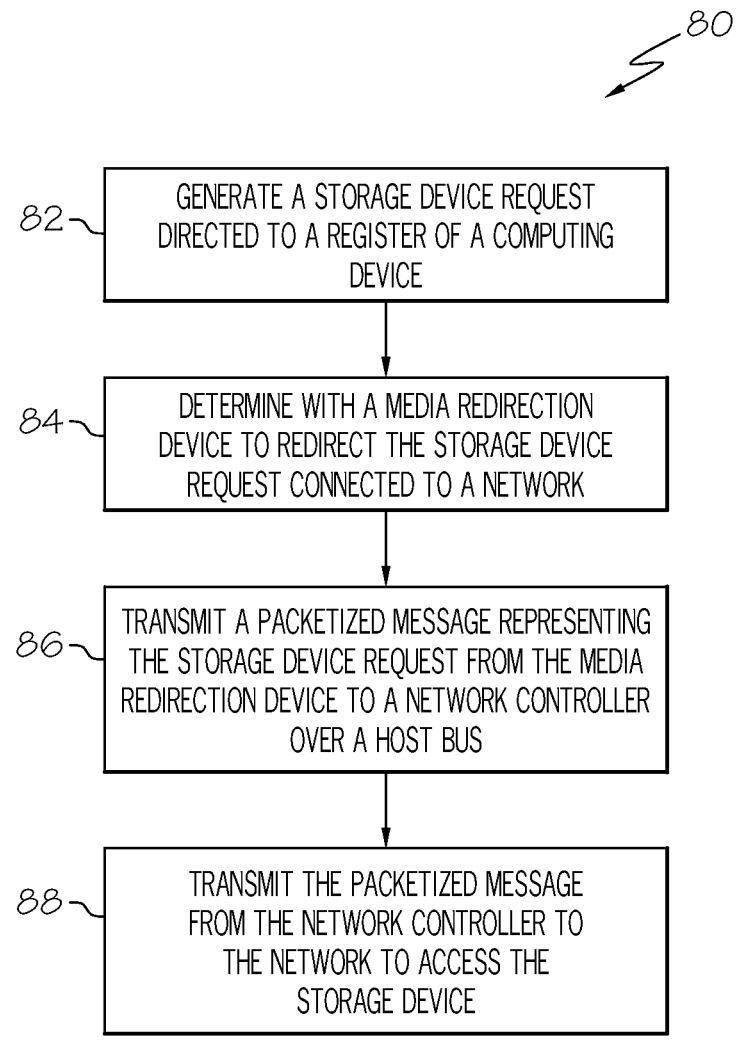
FIG. 4 shows a flowchart illustrating a method of performing media redirection.

FIG. 4 shows flowchart 80, which illustrates a method that may be implemented to execute media redirection. The flowchart 80 includes operation 82, which includes generating a storage device request directed to a register of a computing device, such as the request for control of the storage device 14 generated by the bus owner 16 and directed to the storage interface register 32 as shown in FIGS. 1 and 2. Operation 82 may also occur in the illustrative embodiment of FIG. 5, the host controller 74 receives the request 30 for control of the storage device 14 generated by the bus owner 16.

Operation 84 includes determining with a media redirection device to redirect the storage device request to a storage device connected to a network. This operation may be carried out by the media redirection devices 20 and 42 as described in regard to FIGS. 1 and 2, respectively. Furthermore, the media redirection device 60 shown in FIG. 3 may also carry out this operation, as described herein.

Operation 86 includes transmitting a packetized message representing the storage device request from the media redirection device to a network controller over a host bus. This operation may be carried out by the management controller 28 of the media redirection device 20, as discussed in FIG. 1. The management controller 28 may packetize the VDM 24 and transmit it to the network controller 22 over the PCI Express interconnect switch 18. The operation 86 may be similarly carried out by the management controller 46 as described in regard to FIG. 2. The operation 86 may be similarly carried out by the management controller 64 as described in regard to FIG. 3.

Operation 88 includes transmitting the packetized message from the network controller to the network to access the storage device connected to network. The network controller 22 of FIG. 1 may carry out this operation, as described, in transmitting the packetized VDM 34 to the network 12. The network controller 54 shown in FIG. 2 may carry out operation 86 by transmitting the VDM 52 to the network 12. Similarly, the network controller 73 may carry out operation 86 by transmitting the packetized VDM 69 to the network 12.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A method comprising:
    generating with a storage driver a storage device request directed to a register of a computing device that is used to access a storage device of the computing device,
    determining with a media redirection device to redirect the storage device request to a storage device connected to a network, wherein the media redirection device is configured to emulate operation of and appear as a locally connected storage device to the computing device, and software running on the computing device, that generated the storage device request,
    converting with a drive emulation device of the media redirection device the storage device request to a vendor-defined message (VDM),
    packetizing with a management controller of the media redirection device the VDM, wherein the packetized VDM comprises encapsulated network packet data, the encapsulated network packet data comprising network routing information,
    transmitting over a PCI Express interconnect switch of the computing device, the PCI Express interconnect switch being separate from the media redirection device, the packetized VDM representing the storage device request from a VDM interface of the media redirection device to a VDM interface of a network controller, wherein the storage device is connected to the network controller via the network, and
    transmitting the packetized VDM from the network controller to the network to access the storage device connected to the network per the storage device request.

2. The method of claim 1, wherein the transmitting over a PCI Express interconnect of the computing device the packetized VDM comprises transmitting over a PCI Express interconnect switch of the computing device the packetized VDM representing the storage device request from a VDM interface of the management controller to the VDM interface of the network controller.

3. The method of claim 2 further comprising transmitting over the PCI Express interconnect switch of the computing device the packetized VDM from a VDM interface of the drive emulation device to the VDM interface of the management controller.

4. The method of claim 1, wherein the transmitting the packetized VDM from the network controller to the network further comprises:
    executing emulation software by the network to access the storage device connected to the network per the storage device request, and
    generating a response by the storage device to comply with the storage device request.

5. The method of claim 1, wherein the generating a storage device request directed to a register of a computing device comprises generating a storage device request directed to a host controller interface of a host controller that is used to access a storage device of the computing device.

6. An apparatus comprising:
    a media redirection device to determine redirection of a storage device request generated by a storage driver to access a storage device connected to a network, wherein the media redirection device is configured to emulate operation of and appear as a locally connected storage device to a computing device, and software running on the computing device, that generated the storage device request, the media redirection device comprising:
        a drive emulation device configured to convert the storage device request to a vendor-defined message (VDM);
        a management controller configured to packetize the VDM, wherein the packetized VDM comprises encapsulated network packet data, the encapsulated network packet data comprising network routing information; and
        a VDM interface configured to transfer and receive the packetized VDM;
    a PCI Express interconnect switch connected to the media redirection device, the PCI Express interconnect switch being separate from the media redirection device, and
    a network controller connected to the PCI Express interconnect switch and to the network, a VDM interface of the network controller to receive the packetized VDM representing the storage device request from the VDM interface of the media redirection device through the PCI Express interconnect switch and the network controller to transmit the packetized VDM to the network to access the storage device connected to the network, wherein the storage device is connected to the network controller via the network.

7. The apparatus of claim 6, wherein the network controller further to receive a packetized network message generated from a storage device connected to the network, and transmit the packetized network message through the PCI Express interconnect switch to the media redirection device.

8. The apparatus of claim 6, wherein the drive emulation device and the management controller are connected to the PCI Express interconnect switch, and
    wherein, a VDM interface of the management controller is configured to receive the VDM from a VDM interface of the drive emulation device through the PCI Express interconnect switch.

9. The apparatus of claim 8, wherein the network controller is connected to the PCI Express interconnect switch and a VDM interface of the network controller is configured to receive the packetized VDM from the VDM interface of the management controller through the PCI Express interconnect switch.

10. The apparatus of claim 6, wherein the drive emulation device comprises a storage controller interface to receive a storage device request to access a storage device connected to a network.

11. The apparatus of claim 6, wherein the drive emulation device comprises a storage peripheral interface to receive a storage device request to access a storage device connected to a network.

12. The apparatus of claim 6 further comprising a host controller to receive a storage device request to access a storage device located on a network and to transmit the request to a storage peripheral interface of the media redirection device.

\* \* \* \* \*